C. E. ROOT.
WHEEL.
APPLICATION FILED DEC. 8, 1913.

1,120,543.

Patented Dec. 8, 1914.

Witnesses
Frederick L. Fox.
Sue Magruder.

Inventor
C. E. Root.

By Gowell & Gowell
Attorneys

UNITED STATES PATENT OFFICE.

CLAUDE E. ROOT, OF CAMBRIDGE SPRINGS, PENNSYLVANIA.

WHEEL.

1,120,543.  Specification of Letters Patent.  Patented Dec. 8, 1914.

Application filed December 8, 1913. Serial No. 805,277.

*To all whom it may concern:*

Be it known that I, CLAUDE E. ROOT, a citizen of the United States, residing at Cambridge Springs, in the county of Crawford and State of Pennsylvania, have invented certain new and useful Improvements in Wheels, of which the following is a specification.

The invention relates to an improvement in wheels of the resilient type, comprehending specifically a wheel embodying sectional spokes with a spring controlled connection between the sections of the spokes, and with spring controlled connections between one section of the spoke and the wheel rim.

The main object of the present invention is the provision of a wheel embodying spokes arranged in telescopically arranged sections, the relatively outer section being pivotally connected to the wheel rim and yieldingly held in radial relation to such rim by remotely located springs, whereby all necessary movements of the wheel rim with relation to the spokes is permitted in the rotative movement of such wheel.

The invention in its preferred form of details will be described in the following specification, reference being had particularly to the accompanying drawings, in which:—

Figure 1:
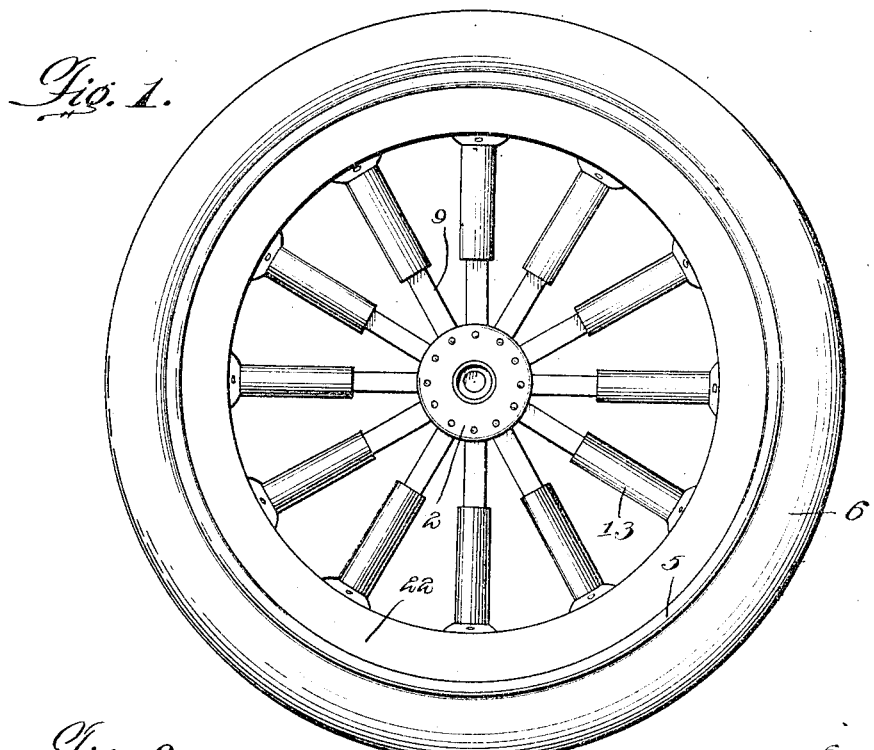
Figure 2:
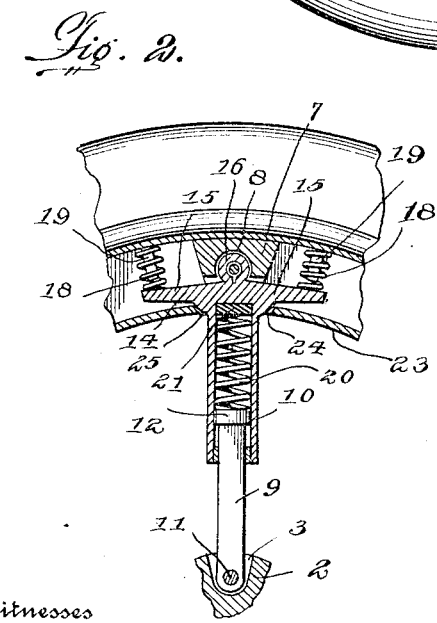
Figure 3:
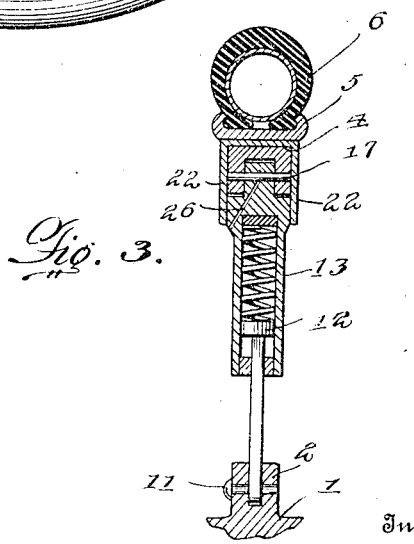

Figure 1 is a view in elevation of the improved wheel. Fig. 2 is a broken section through the wheel taken at right angles to the axis. Fig. 3 is a sectional view taken at right angles to Fig. 2.

The improved wheel, illustrated in the drawings, in its preferred form, comprises a hub 1 formed for the reception of the axle and including an annular radial extension 2, formed at appropriate intervals with sockets 3 having outwardly divergent end walls, as shown in Fig. 2.

The felly of the wheel is in the form of an annular member 4 to which on the outer surface, is secured any desirable type of rim 5 for holding in place any desired type of tire 6. To the felly, at appropriate intervals, and corresponding in number to the number of sockets 3, are secured blocks 7, which are formed in their relatively inner faces with rounded depressions 8, the rounded planes of which are in the circumferential plane of the felly.

The spokes comprise inner and outer sections 9 and 10, the former being in the form of rod like members pivotally connected within the sockets 3 by pivot bolts 11, extending through the annular member 2 of the hub. The outer ends of the sections 9 are formed to provide disk heads 12 slidably fitting within the cylindrical hollow portions 13 of the sections 10 of the spokes. The sections 13 are formed integral with what I term a bearing section 14 arranged at the outer end of the section 13 and including bearing arms 15, projecting laterally from and extending beyond the plane of the section 13, and a disk-like extension 16 projecting from the outer surface of the bearing member in line with the section 13.

The extension 16 of the hollow section of the spoke is rotatably mounted in the depression 8 in the block 7, a pivot pin 17 passing through the block and extension to pivotally connect the spoke section to the block for movement in a plane at right angles to the axis of the wheel. The bearing arms 15 extend in both directions beyond the block, and springs 18 of suitable strength are interposed between the free ends of said arms and the wheel felly, pins 19 projecting from the felly maintaining the position of the springs, and at the same time serving to limit the movement of the arms toward the felly.

A spring 20 is arranged within the hollow section 13 of the spoke, bearing at one end against the head 12, and at the opposite end against a silencer 21, preferably in the form of a hard rubber disk arranged within and at the outer end of the section 13.

Side plates 22 are secured to the felly and overlie and protect the parts beyond the end of the hollow section 13, an inner plate 23 closing the space between the side plates. The plate 23 is formed with openings 24 to permit the passage therethrough of the rounded inner portion 25 of the bearing members, thereby permitting a swinging movement of said members, as will be obvious. The respective blocks 7 are rounded to permit the necessary pivotal movement of the bearing members. The bearing members 14 are formed with passages 26 opening at one end to the pivot pin openings in the extensions 16, and at the opposite end at one side of the hollow sections 13, the passages providing oil channels for lubricating the described connection.

From the above description, it will be obvious that the improved spring wheel presents a completely resilient structure capable of yielding in all directions necessary for a proper resilient movement between the felly and hub under the load strain, and that the operative parts of said wheel are fully and completely protected against dust and dirt.

It is of course to be understood that the details of proportion, or of material is unimportant, as I contemplate any desired proportions of parts at any possible requirement, and the use of such materials as may best serve the particular function for which the wheel is designed.

What is claimed is:—

A spring wheel including a hub, a hollow felly, spokes including telescopically arranged inner and outer sections and cushioning means arranged between the sections, blocks secured within the felly, the outer sections of the spokes being integrally enlarged and terminally formed beyond the enlargement with projections, means for pivotally connecting the projections to the blocks, said enlarged portion fitting within the hollow felly and being formed with a rounded portion to fit an opening formed in the inner plate of the hollow felly in the full play of the spoke, closing the same under all conditions, arms extending laterally from the enlarged portion within the hollow felly and springs disposed radially of the wheel and bearing between the arms and the felly, those portions of the arms receiving the spring bearings being inclined with respect to the vertical plane of the spoke to present surfaces at right angles to the radially arranged springs.

In testimony whereof, I affix my signature in presence of two witnesses.

CLAUDE E. ROOT.

Witnesses:
PEARL MONDEREAN,
FLORENCE A. HOUSTON.

Copies of this patent may be obtained for five cents each, by addressing the "Commissioner of Patents, Washington, D. C."